INVENTOR.
Ralph R. Bekkala &
BY Harvey G. Humphries
ATTORNEY

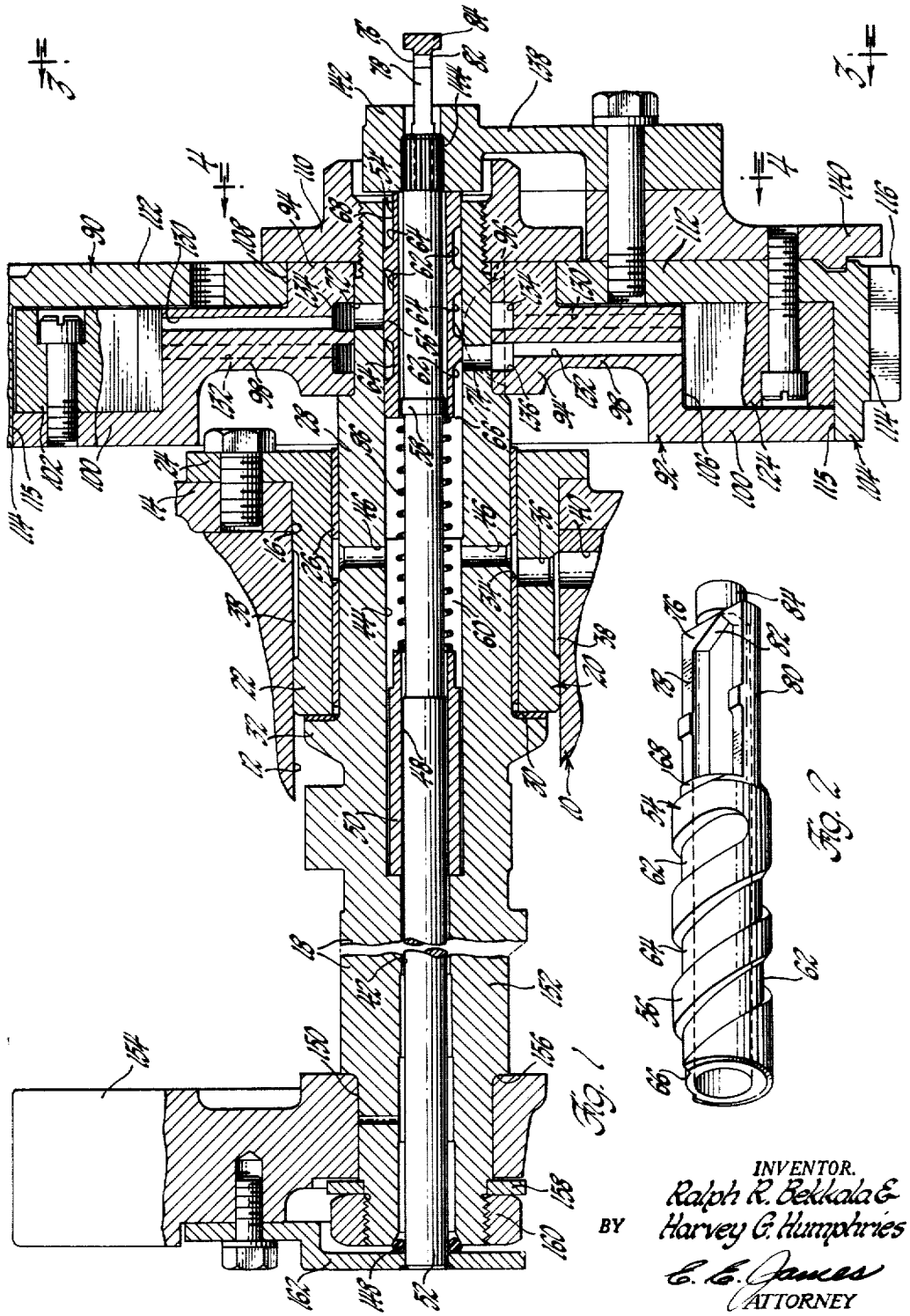

United States Patent Office 3,109,417
Patented Nov. 5, 1963

---

3,109,417
ENGINE TIMING AND BALANCING MECHANISM
Ralph R. Bekkala, Detroit, and Harvey G. Humphries, Birmingham, Mich., assignors to General Motors Corporation, Detroit, Mich., a corporation of Delaware
Filed Jan. 9, 1962, Ser. No. 165,182
5 Claims. (Cl. 123—90)

This invention relates generally to an internal combustion engine and particularly contemplates a servo mechanism operable to modify the operative cyclic timing and thus the power output or energy absorbing characteristics of an internal combustion engine without disturbing the phased relationship of associated engine balancing means.

The instant application and the invention herein described represents a continuation-in-part improvement of the servo mechanism shown and described in co-pending United States patent application Serial No. 94,887, entitled "Phase Adjusting Servo Mechanism for Internal Combustion Engine and the Like," filed March 10, 1961, in the names of Ralph R. Bekkala and Harvey G. Humphries. The servo mechanism of the invention thus has particular application for varying camshaft timing of exhaust valve opening in a two-cycle uniflow scavenged internal combustion engine of the type shown and described in United States Patent No. 2,179,709, to A. F. Brecht, entitled "Internal Combustion Engine." Such camshaft timing adjustment permits conversion of the engine from its normal engine power generating cycle to that of an energy absorbing compressor capable of providing variable braking action of an associated engine driven load such as a motor vehicle. With the phase adjusting servo mechanism of the above-identified patent application, the driven phased relationships between the several balancing weights or masses are necessarily compromised, at least during periods of compressive engine braking. The instant servo mechanism eliminates such compromising of the auxiliary engine balancing means.

Although having particular application for compressive engine braking purposes, the servo mechanism of the invention is not deemed to be so limited, being applicable generally to angular phase adjusting mechanisms operable to selectively adjust the phase relation between a driven power input member and certain driven load members while maintaining the phased relationship between the input member and certain other driven load members such as the instant phased balancing masses.

The foregoing and other objects, advantages and features of the invention will be apparent from the following description of an illustrative embodiment, having reference to the accompanying drawing, in which:

FIGURE 1 is a fragmentary view of a portion of an internal combustion engine incorporating the invention with portions thereof broken away and shown in section substantially in the direction of the arrows and in the plane of the line indicated at 1—1 of FIGURE 3;

FIGURE 2 is a perspective view of a servo controlling valve member shown in section in FIGURE 1;

Figure 3:
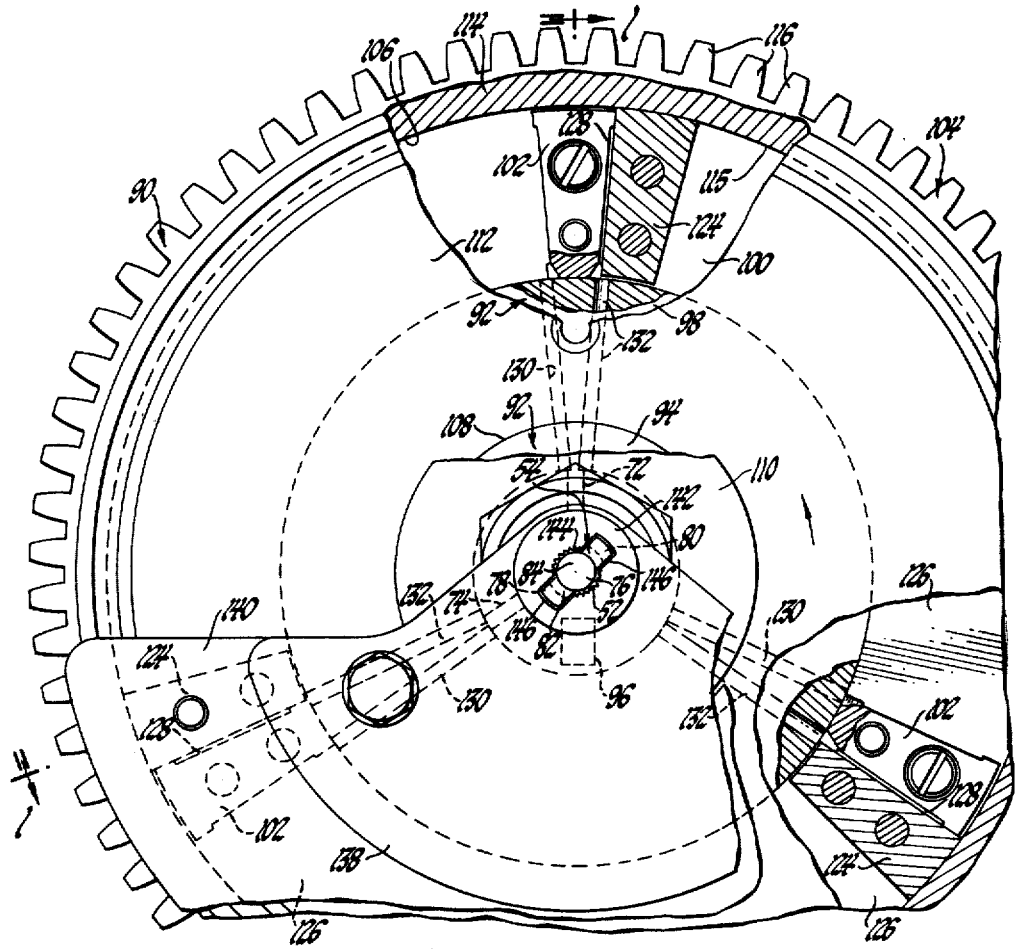
FIGURE 3 is a fragmentary elevational view taken substantially in the direction of the arrows indicated at 3—3 of FIGURE 1 with portions thereof broken away and shown in section.
Figure 4:
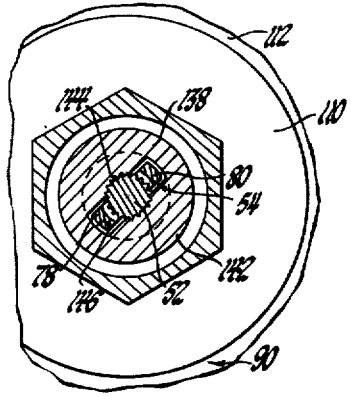
Figure 5:
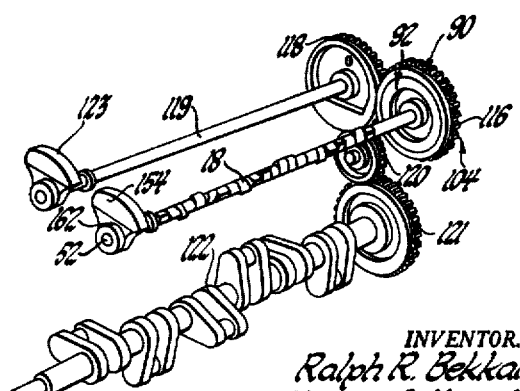

FIGURE 4 is a view similar to a portion of FIGURE 3 with other portions thereof broken away and shown in section substantially in the direction of the arrows and in the plane of the line indicated at 4—4 of FIGURE 1; and FIGURE 5 is a diagrammatic view showing application of the servo mechanism of the invention to the balancing system to a two-cycle internal combustion engine of the type indicated.

Referring more particularly to FIGURE 1, an engine frame member is partially shown at 10 and has a camshaft mounting gallery 12 extending longitudinally therethrough. A gear housing member partially shown at 14 is suitably and sealingly secured to the end wall of the frame member and has an opening 16 mating with the camshaft gallery. A hollow camshaft 18 is rotatably supported within the camshaft gallery by a plurality of longitudinally spaced bearings, only one end bearing being shown at 20. This end bearing comprises a cylindrical bearing support member 22 having a sleeve portion slidably embraced by the aligned housing and frame defined ably gallery openings and having a radial end flange 24 suitably secured to the gear housing adjacent the opening 16. Two bearing sleeves 26 are axially spaced within the sleeve portion of the support member and rotatably support the adjacent camshaft end journal portion 28. A thrust bearing washer 30 is interposed between the cylindrical end of the bearing support member 22 and a thrust shoulder 32 formed integrally of the camshaft.

The annular groove 34 defined between the spaced bearing sleeves 26 communicates through a radial port 36 and a circumferential outer groove 38 in the bearing sleeve portion with a pressurized oil supply passage 40 in the engine frame member. The camshaft is longitudinally drilled at 42 to define an oil distribution gallery. This gallery is connected through radial ports to its several journal portions and bearings. The camshaft is counterbored at 44 from its gear housing projecting end through its adjacent end journal portion. The counterbore 44 is connected through radial ports 46 in the camshaft journal portion 28 to the annular oil pressure supply groove 34 of the bearing 20. The counterbore 44 is also connected to the camshaft oil distribution gallery 42 through a flow restriction 48 defined between a sleeve 50 seated at one end against the shoulder of the counterbore and a shaft 52 closely embraced by and extending through the oil gallery defining bore and counterbore.

A hollow valve member 54 is reciprocably mounted in the opened end of the camshaft counterbore 44 and slidably embraces the adjacent end of the shaft 52. As best seen in FIGURE 2, this valve member comprises a cylindrical valve portion 56 and a relatively flat guide or key portion 76 extending axially therefrom. The cylindrical valve portion has sliding sealing engagement outwardly with the camshaft counterbore and inwardly with a seal land 58 formed circumferentially of the inner shaft 52. The valve portion thus defines a cylindrical oil receiving chamber 60 between the shaft 52, the counterbore 44 and the sleeve 50. The valve portion 56 is helically relieved from opposite ends at 62 and 64 to form a pressure inlet port and a pressure relieving outlet port, respectively. The inlet port is connected at 66 to the chamber 60 and therethrough to the oil pressure supply. The helical pressure relieving outlet port is connected at 68 to the interior of the gear housing member and therethrought the oil sump of the engine, not shown. Reciprocation of the valve member and the effected rotation of the camshaft relative thereto cause the valve member to alternately control the supply and discharge of oil pressure to and from the servo motor through two radial ports 72 and 74 spaced longitudinally of the camshaft journal position.

The relatively flat guide portion of the valve member intersected by an extension of the shaft embracing bore of the valve portion and thus defines two legs 78 and 80 flanking the end portion of the shaft 52 on opposite sides thereof. The legs 78 and 80 are interconnected at their ends distal from the valve portion 56 by a bight 82 and an actuating head 84 formed integrally therewith. The head 84 is thrustably engageable by a member actuated by a suitable engine phase, load or power controlling device, such as a vehicle brake energizing pedal, an engine throttle control, or an engine or vehicle speed limiting governor. The servo controlling valve is movable by such a control device beween an extreme camshaft retarding position, shown in FIGURES 1 and 3 and corresponding to normal engine cycle operation, and an extreme camshaft advancing position wherein compressive cycle operation is effected by the engine. A valve return spring 86 embraces the shaft 52 and is compressively interposed between the opposing ends of the sleeve 50 and the cylindrical valve portion 56 within the pressure supply chamber 60. This spring normally acts in conjunction with the supplied oil pressure to bias the valve member toward its extreme camshaft retarding position.

In addition to the control valve mechanism defined by the valve member and the porting of the adjacent camshaft end portion, the illustrative engine cycle or phase adjusting mechanism includes a combined camshaft driving gear and servo motor indicated generally by the reference numeral 90. This combined gear and motor comprises a camshaft driving member 92 having a central hub portion 94 keyed at 96 to the camshaft end portion. A spider portion 98 extends radially outwardly of the hub to an annular chamber defining wall portion 100 which carries three equiangularly spaced, radially extending vanes or piston members 102. In the illustrative embodiment, these vane members 102 are suitably secured to the chamber defining wall by radially spaced bolts and dowel pins, as shown.

A gear member 104 is rotatably mounted with respect to the camshaft driving member 92 and cooperates therewith to define an annular chamber 106. The gear member is centrally perforated at 108 and journaled and retained on the hub of the camshaft driving member by a flanged nut 110 threaded on the adjacent end of the camshaft. A wall portion 112 of the gear member extends radially outwardly of the journal opening 108 to one end of a cylindrical flange 114. The opposite end of this flange is sealingly journaled at 115 on the outer periphery of the member 92 to define the annular chamber 106 therebetween. Inwardly, the wall 112 has rotative sealing clearances with the spider and hub portions of the camshaft driving member. A plurality of gear teeth 116 are formed circumferentially of the cylindrical flange 114. As best seen in FIGURE 5, the gear teeth 116 mesh with the mating teeth of a balance weight gear 118 mounted on the adjacent end of a balance shaft 119. The gear 118 is in turn driven through an idler gear 120 by a timing gear 121 mounted on and driven by the engine crankshaft 122. A balance weight 123 is secured to the opposite end of the shaft 119 with its mass diametrically and eccentrically disposed to that of the balance shaft driving gear 118.

Three vanes or piston members 124 are equiangularly spaced and suitably secured to the radial wall portion 112 of the gear member by radially spaced bolts and dowel pins, as shown. These vanes cooperate with the vanes 102 to subdivide the annular chamber 106 into a plurality of opposed expansible motor chambers 126 and 128. The several expansible motor chambers 126 and 128 are connected respectively through passages 130 and 132 in the camshaft driving member 92 to two annular chambers or grooves 134 and 136 opening inwardly and spaced longitudinally of the hub 94. The grooves 134 and 136 mate respectively with the valve controlled radial ports 72 and 74 in the camshaft end portion.

With counterclockwise driving rotation of the camshaft as indicated in FIGURE 3, fluid pressure alternately supplied to the expansible chamber 126 and 128 effects relative rotation between the camshaft driving and gear members to either retard or advance the camshaft timed exhaust valve opening. As previously indicated, such oil pressure supply and the resultant camshaft timing adjustment is regulated by longitudinal positioning of the valve member 54. The valve member is non-rotatably maintained with respect to the gear member 104 by a combined valve guide and balance weight member 138. This weight member is suitably secured with a second arcuate balance weight member 140 to the wall portion 112 of the gear member. The weight and guide member 138 has a hub portion 142 internally splined at 144 to the adjacent end of the shaft 52 and slotted at 146 to reciprocably receive the guide legs 78 and 80 of the valve member 54. The shaft 52 and valve member 54 are thus drivingly connected for rotation with the combined gear and balance weight assembly.

The opposite end of the shaft 52 projects slightly beyond the end of the camshaft distal from the servo motor gear 90. The adjacent end of the camshaft oil gallery 42 is sealed by a seal ring 148. The camshaft has a reduced diameter journal bearing portion 150 which extends beyong its end journal portion 152. This reduced diameter bearing portion journals an auxiliary engine balancing weight member 154 which is secured on the camshaft end bearing portion 150 between a camshaft shoulder 156 and a thrust bearing washer 158 by a nut 160. The balance weight member 154 is rotatably driven by the shaft 52 through a plate 162 extending radially between and secured inwardly to the projecting end of the shaft 52 and outwardly to the mass of the balance weight member 154. The center of mass of the gear driven balance weights 138 and 140 and of the shaft driven balance weight 154 are disposed eccentrically on diametrically opposite sides of the camshaft axis. Referring once again to FIGURE 5, such balance weights cooperate with the similarly disposed balance masses of the gear and weight mounted on opposite ends of a counter-rotating cam or auxiliary balance shaft 119 to balance the primary rocking couple of a two-cycle internal combustion engine of the type indicated. This relationship is maintained between the several balancing weights irrespective of timing adjustment of the camshaft by the driving connection provided by the shaft 52.

Under normal engine operating conditions, the valve member 54 is maintained in its spring and oil pressure biased camshaft retarding position shown in FIGURE 1. In this position, the helical valve port 62 serves to supply pressurized oil through the radial port 72, the annular groove 134 and the passages 132 to the camshaft retarded expansible chambers 126. The fluid pressure thus supplied acts in conjunction with the torque loading imposed on the camshaft by the several exhaust valve and fuel injection actuating mechanisms to maintain the several gear carried vanes 124 in driving engagement with the vanes 102 carried by the camshaft driving member, the several camshaft advancing expansible chambers 118 being vented to the gear housing and sump through the passages 130, the groove 136 and the helical valve port 64. The driving engagement effected between the servo motor vanes provides normal two-cycle engine timing of the several exhaust valves.

In two-cycle internal combustion engines of the type indicated, fuel supply is normally accomplished by pressure injection into the several engine cylinders. The fuel injecting means is normally regulated between no fuel and full fuel supply conditions through the operation of a throttle control between governor maintained minimum and maximum engine speed limits. When the throttle control is released to its idle speed position while the vehicle is moving and driving the engine at a speed in excess of engine idle speed, the speed responsive mechanism of the governor actuates the fuel supply regulating means to its fuel off position. Under such conditions, the driven engine absorbs a certain amount of energy and thus tends to brake the vehicle. This braking effect is normally dependent upon frictional load of the motored engine and of the various associated accessory loads, including the engine scavenging and charging blower and to a limited extent upon the energy required to compress the air charged within the several cylinders. The energy absorbed in compressing the air charge within the several cylinders of a motored engine is normally limited to the period between exhaust valve closing at approximately 80° of crankshaft rotation past its bottom center up to its top center position. A substantial portion of this absorbed compressive energy, however, is normally returned to the engine crankshaft during the initial portion of the subsequent power stroke prior to the opening of the exhaust valve which occurs between 85° and 100° of crankshaft rotation past its top center position for each cylinder.

As indicated above, the servo control mechanism 90 is operable to advance the camshaft timing and thus the opening and closing of the several exhaust valves in accordance with the effected positioning of the valve member 54 relative to the radial valve porting of the camshaft. Such advancing of exhaust valve timing increases the compression period and the air charged volume subjected to compression and reduces or prevents compressive power return to the engine crankshaft. The engine is thus caused to operate as a variable capacity compressor braking the inertial load of the engine and associated vehicle.

Limited longitudinal movement of the valve member 54 to the left as viewed in FIGURE 1 effects communication between the helical pressure supply port 62 and the camshaft radial port 74. Actuating oil pressure is thus supplied to the camshaft advance expansible chambers 128. At the same time, the helical pressure relieving valve port 64 opens the camshaft port 72 and thus starts to relieve the oil pressure previously supplied to the several radial expansible chambers 126. This causes camshaft advancing rotation between the camshaft driving and gear members 92 and 104 until the ports 72 and 74 are covered by the helical land extending between the valve ports 62 and 64. In this port closed position, limited leakage occurs between the several chamber defining members thus permitting pressure to build up on both sides of the several vane or piston members until a balanced fluid pressure is obtained. This balanced pressure condition hydraulically maintains the camshaft in an adjusted position corresponding to the desired compressive braking effect indicated by the initial positioning of the valve member.

Should additional braking be desired, the valve member may be further shifted to the left wtih resultant further advancing of the camshaft until the ports 72 and 74 are again closed by the valve member and a new equilibrium pressure condition is achieved between the retard and advanced chambers. To reduce the braking effect, the valve member is permitted to return toward its camshaft retarding fluid pressure supply position wherein the end of the cylindrical valve portion abuts the valve driving hub 142. Such valve movement to an intermediate valve position vents the several advancing chambers and supplies actuating oil pressure to the retarding chambers until a new equilibrium pressure condition is obtained as the ports 72 and 74 are again closed by the effected camshaft retarded rotation. Such valve movement thus retards the exhaust valve closing and opening and reduces the power absorbing compressive braking action of the engine.

It will thus be seen that the servo mechanism 90 permits adjustment of the camshaft timing, converting the engine from its normal cycle to a compressive braking or load, without comprising the phased relationship of the several engine balancing weights associated therewith.

While the foregoing description has been limited to a single illustrative embodiment of the invention having particular application to an engine braking control, it will be obvious to those skilled in the art that various modifications might be made therein and other applications made without departing from the spirit and scope of the invention as defined in the following claims.

We claim:
1. In an internal combustion engine means for regulating the power output and compression timing characteristic of the engine including,
   a hollow camshaft journaled within and projecting at opposite ends from said engine,
   an engine-driven servo mechanism mounted on one end of said camshaft and selectively operable to vary the angular phased timing relation between the camshaft and engine output thereby varying the power output and compression timing characteristics of the engine,
   a first engine balancing mass carried and rotatably driven by said servo mechanism eccentrically of the camshaft in timed phased relation to the engine output,
   a second engine balancing mass journaled on the opposite end of said camshaft,
   and shaft means extending through said camshaft and drivingly interconnecting said second engine balancing mass for rotation with said first balancing mass in timed phased relation to the engine output irrespective of the camshaft timing adjustment effected by said servo mechanism.

2. In an internal combustion engine, an engine timing and balancing system including,
   an engine-driven crankshaft,
   a hollow camshaft journaled within the engine and rotatably operable to sequentially operate associated exhaust valves,
   a servo mechanism mounted on one end of said camshaft,
   gear means drivingly interconnecting said servo mechanism to the crankshaft of the engine and said servo mechanism being selectively operable to vary the angular phased timing relation between the camshaft and engine crankshaft and thereby the power output and compression timing characteristics of the engine,
   a first engine balancing mass carried by said servo mechanism eccentrically of the camshaft and driven in timed phased relation to the engine crankshaft,
   a second engine balancing mass journaled on the opposite end of said camshaft,
   and shaft means extending through said camshaft and rotatably driving said second balancing mass with said first balancing mass in timed phased relation to the engine crankshaft irrespective of the camshaft timing adjustment effected by said servo mechanism.

3. In a two-cycle internal combustion engine, an engine, an engine balancing and timing mechanism operable to modulate the cyclic timing of the engine thereby regulating its power output and compression timing characteristics, said mechanism comprising,
   a hollow camshaft journaled in and projecting at opposite ends from said engine and rotatably operable to time the scavenged exhausting and charging of the several engine combustion chambers,
   passage means for supplying pressurized oil to the bore of said camshaft,
   a first member drivingly secured to one end of said camshaft,
   a second member rotatably and sealingly mounted with respect to said first mmeber and cooperating therewith to define an annular chamber,
   means for driving said second member in timed phased angular relation to the engine output,
   said first and second members each having equiangularly spaced radial vanes cooperating to divide said annular chamber into a first and second plurality of paired opposing expansible motor chambers,
   passage means connecting the opposing pairs of said expansible chambers to longitudinally spaced and angularly disposed ports opening inwardly of said camshaft bore, a hollow valve member reciprocably and rotatably mounted within said camshaft bore, a first engine balancing member drivingly connecting the valve member for rotation with said second member and having its balancing mass disposed eccentrically of the rotative axis of the camshaft, said valve means being operable to connect said first and second opposing chambers alternatively to said pressure supply means and to vent fluid pressure therefrom dependent on the axial positioning of said valve member and the adjusted angular position of said first and second members, a second engine balancing member journaled on the opposite end of said camshaft and having a balancing mass disposed eccentrically of the camshaft rotative axis, and a shaft member extending longitudinally through said camshaft and valve member and drivingly connecting said second balance weight member to said first weight member diametrically opposite the balancing mass of said first weight member thereby driving said second balance weight in timed phased relation to said first balance weight and engine output irrespective of the servo adjusted angular positioning of the camshaft.

4. In an internal combustion engine, an engine balancing and timing mechanism operable to counterbalance rocking couples acting on the engine and to regulate the compression timing and absorbing characteristics of the engine, said mechanism comprising, two shafts journaled in parallel spaced relation, at least one of said shafts being a hollow camshaft rotatably operable to sequentially exhaust the several engine combustion chambers, a first gear and engine balancing member rotatably mounted with respect to one end of said camshaft and having its engine balancing mass disposed eccentrically of the rotative axis of the camshaft, a second gear and engine balancing member secured on the adjacent one end of the other of said shafts and drivingly engaging said first gear member to effect counterrotation therebetween and having an eccentric balancing mass oriented to cooperate with the eccentric mass of said first member to counterbalance the rocking couple normally acting on the adjacent end of the engine, gear means driving one of said first and second gear and engine balancing members in time phased angular relation to the engine output, a third engine balancing member secured on the opposite end of said other shaft and having an eccentric balancing mass diametrically opposite that of said second gear and balancing member, a fourth engine balancing member journaled on the end of said camshaft opposite said first gear and balancing member, a fluid pressure servo motor operable to adjust the angular phased exhaust timing relation between said camshaft and first gear member in accordance with the controlled supply of fluid pressure to and from said motor, and a shaft member extending longitudinally through said camshaft and drivingly interconnecting and orienting the eccentric balancing mass of said fourth engine balancing member diametrically opposite the balancing mass of said first balancing member thereby driving said fourth balancing member in timed phased relation to the engine output and cooperating with said third balancing member to counteract the rocking couple normally applied to the adjacent end of the engine irrespective of the servo adjusted angular positioning of the camshaft.

5. In a two-cycle internal combustion engine, an engine balancing and timing mechanism operable to counterbalance rocking couples acting on opposite ends of the engine and to regulate the cyclic timing and thereby the power output and compression timing characteristics of the engine, said mechanism comprising, two spaced parallel shafts journaled in and projecting at opposite ends from the engine, at least one of said shafts being a hollow camshaft operable to sequentially control the scavenged exhausting and charging of the several engine combustion chambers, means for supplying pressurized oil to the bore of said camshaft, a hub member drivingly secured to one end of said camshaft, a first gear and engine balancing member rotatably and sealingly mounted with respect to said hub member and cooperating therewith to define an annular chamber and having an engine balancing mass disposed eccentrically of the rotative axis of the camshaft, said hub and first gear members each having equiangularly spaced radial vanes cooperating to divide said annular chamber into a first and second plurality of paired opposing expansible motor chambers operable to adjust the angular phased relation between said hub and first gear member, passage means connecting the opposing pairs of said expansible chambers to longitudinally and angularly disposed ports opening on said camshaft bore, a hollow valve member reciprocable within said camshaft bore and drivingly connected for rotation with said first gear member and alternately operable to connect the paired opposing chambers through said camshaft bore to said pressure supply means and to vent fluid pressure therefrom dependent on the axial positioning of said valve member and the adjusted angular position of said first and second members, a second gear and engine balancing member drivingly engaging said first gear member and secured on the adjacent end of the other of said shafts to effect counterrotation between said shafts, gear means for driving one of said first and second gears in time phased angular relation to the engine output, said second gear member having its balancing mass disposed eccentrically of its rotative axis and oriented in assembly to cooperate with the eccentric mass of said first gear and balancing member to counteract the normal rocking couple applied to the adjacent end of the engine, a third engine balancing member secured on the opposite end of said other shaft and having its balancing mass eccentrically and diametrically opposite the balancing mass of said second gear and balancing member, a fourth engine balancing member journaled on the opposite end of said camshaft and having its balancing mass oriented eccentrically and diametrically opposite the balancing mass of said first balancing member, and a shaft member extending longitudinally through said camshaft and valve member and drivingly interconnecting said first and fourth engine balancing members thereby driving said fourth balancing member in timed phased relation to the engine output and cooperating with said third balancing member to counteract the rocking couple normally applied to the adjacent end of the engine irrespective of the servo adjusted angular positioning of the camshaft.

No references cited.

UNITED STATES PATENT OFFICE
CERTIFICATE OF CORRECTION

Patent No. 3,109,417　　　　　　　　　　November 5, 1963

Ralph R. Bekkala et al.

It is hereby certified that error appears in the above numbered patent requiring correction and that the said Letters Patent should read as corrected below.

Column 6, lines 52 and 53, strike out "an engine,"; line 66, for "mmeber" read -- member --.

Signed and sealed this 7th day of July 1964.

(SEAL)
Attest:

ERNEST W. SWIDER
Attesting Officer

EDWARD J. BRENNER
Commissioner of Patents